United States Patent [19]
Thiessen

[11] Patent Number: 5,495,412
[45] Date of Patent: Feb. 27, 1996

[54] COMPUTER-BASED METHOD AND APPARATUS FOR INTERACTIVE COMPUTER-ASSISTED NEGOTIATIONS

[75] Inventor: Ernest M. Thiessen, Abbotsford, Canada

[73] Assignee: ICAN Systems, Inc., Canada

[21] Appl. No.: 275,521

[22] Filed: Jul. 15, 1994

[51] Int. Cl.$^6$ .................................................. G06F 19/00
[52] U.S. Cl. ............................................................ 364/401
[58] Field of Search .................................. 364/401, 409; 395/933, 925

[56] References Cited

PUBLICATIONS

Schuler, D., Conference Title: DIAC-88: Directions and Implications of Advanced Computing, Aug. 1988, pp. 84–101.
Thiessen, Ernest M. et al., "Computer Assisted Negotiation of Multiobjective Water Resources Conflicts", Water Resources Bulletin, vol. 28, No. 1, pp. 163–167, Feb. 1992.
Thiessen, Ernest Marvin, "ICANS: An Interactive Computer–Assisted Multiparty Negotiation Support System", A Dissertation (Cornell University), pp. 1–157 Jan. 1993, (not shelved until after Jul. 19, 1993).
Rangaswamy, Arvind, "Using Computers to Realize Joint Gains in Negotiations: Toward an Electronic Bargaining Table", pp. 1–43, Mar. 1994.

*Primary Examiner*—Donald E. McElheny, Jr.
*Attorney, Agent, or Firm*—Jones, Tullar & Cooper

[57] ABSTRACT

A computer-based method and apparatus for interactive computer-assisted negotiations assists multiple parties involved in complex multiple issue negotiations in reaching an agreement that optimizes both the individual and overall benefit to the parties. Each of the parties to a conflict or dispute to be negotiated enters their preferences concerning each issue of the conflict into a computer system. If desired, each party to the dispute can have a separate computer system so that each party's preference information remains confidential to that party. The preference information includes data on satisfaction functions for each of the issues which defines a party's relative level of satisfaction as a function of a numerical value for the outcome of that issue. Each party may also enter one or more proposed alternative agreements which provide the party with a specified level of satisfaction. Using standard mixed integer linear programming techniques, the preference information is employed to solve an optimization problem in which an alternative agreement, known as the common base if accepted by all parties, is first generated that provides at least the same level of satisfaction to each party that their own proposal provides, while at the same time minimizing the maximum gain and satisfaction achieved by any party between their proposal and the generated alternative agreement. Next, an optimal agreement to the conflict is determined, again using linear programming techniques, by maximizing the minimum gain in satisfaction achieved by each of the parties in going from the common base to the improved alternative. This will, at the same time, maximize the overall benefit to all of the parties. For maximum security of all party's confidential information, a separate computer system located at a neutral site can be connected to each individual party's computer system. In this case, alternatives are generated at the neutral site and transmitted back to each party's own computer system.

20 Claims, 6 Drawing Sheets

COMPUTER-BASED METHOD AND APPARATUS FOR INTERACTIVE COMPUTER-ASSISTED NEGOTIATIONS

BACKGROUND OF THE INVENTION

The present invention relates in general to a computer-based method and apparatus for assisting multiple parties involved in complex negotiations in reaching an agreement that optimizes the individual and overall benefit to the parties.

Negotiation is a process where two or more parties with conflicting objectives attempt to reach an agreement. This process includes not only bargaining—the presentation and exchange of proposals for addressing particular issues—but also the attempts by each party to discover and use knowledge of the preferences, strengths and weaknesses of their opponents to reach a mutually acceptable resolution. Negotiating parties may be individuals or teams representing their own interests or the interests of their organizations. When there is at least some willingness to engage in negotiation, it can be a constructive alternative to other means (e.g., violence, litigation, stalemate) of settling disputes.

The main purpose of a negotiator is to try to identify alternatives that all parties in conflict will find acceptable. Negotiators must identify and explore the impacts of various decisions, and begin to understand the tradeoffs among these impacts. They should determine, for each proposed solution to the conflict, what each party will get, and what they will have to give up, and whether or not what they get will be worth more than what they will lose.

A third party mediator or facilitator may be included in a negotiation process to help manage the interactions and make suggestions for negotiating parties to consider. Alternatively, an arbitrator may be involved with the power to draft and perhaps dictate settlements for the parties. It is commonly recognized that such disinterested parties can significantly help negotiators in their quest for an agreement.

Recent developments in modeling negotiation processes is motivating work in the use of computer-based analyses of negotiation problems. The complexity of negotiation problems is a challenge. However, computer models today are able to address many of these problems with increasing effectiveness once the issues and stake-holders (those who are in conflict or who will be affected by any agreement) are adequately defined. Any analysis of negotiation problems must permit the updating of issues, preferences, and interested stake-holders as the negotiation process proceeds. This analysis must also include the ability to generate enough information so as not to constrain or limit the options and thinking of those negotiating, yet not overload them with information that may divert or distract them from reaching some mutually satisfactory agreement.

The current literature on interactive computer programs for multi-objective conflict resolution commonly uses the term Negotiation Support System. This term refers to the special type of group decision support system designed for providing assistance in situations where there is disagreement and conflict among various parties as to what decisions to adopt. Research addressing group decision making in multi-objective situations is in its second decade, yet the development and use of Negotiation Support Systems to facilitate and help guide multi-party negotiations is a relatively new field.

Negotiation Support Systems can be categorized according to their functions either as negotiation preparation systems supporting a pre-negotiation strategic planning stage, or negotiation information management systems facilitating negotiations in real time. Negotiation information management systems can be further classified as either context support systems or process support systems. Context models focus on the behavior of the system being designed, managed or operated. Such models are used to answer questions about the performance of the system given any particular decision regarding its design, management or operation. Process models are concerned with the dynamics or procedure of the negotiation process that includes how a group of parties with differing and conflicting objectives can reach an acceptable agreement.

Numerous efforts are underway in each of the various kinds of Negotiation Support Systems described above. Of particular interest are process support systems. These systems are designed to provide a practical means of increasing the likelihood of mutually agreeable settlements when a potential region of agreement exists. Sometimes they can help identify better solutions than would have been found without their use.

The majority of process support systems described in the literature are still in the conceptual stage or are, at best, a "backroom processor" playing a relatively passive role in the negotiation process. Most working systems are single workstations that support a professional mediator rather than the negotiating parties directly. Further work is needed before these models can substantially aid negotiating parties in a complex real-world setting.

These prior art process support systems employ different approaches for generating alternative solutions for multi-objective conflicts involving multiple parties and multiple issues. Two such approaches treat the conflict as a multi-objective optimization problem. These two approaches are discussed in Loucks et al., "Water Resource Systems Planning and Analysis", 1981 and are known as the weighting and constraint methods. With the weighting method, each objective (e.g., maximization of a certain party's satisfaction) is assigned a weight in the overall maximization of total satisfaction in order to generate a single alternative on what is known in the art as the efficiency frontier. The efficiency frontier is defined by Pareto to be a satisfaction tradeoff function which represents the upper boundary of all feasible alternatives and thus defines a set of agreements which provides the maximum overall satisfaction that can be achieved by the parties in the negotiation. The principle disadvantage of the weighting approach is that it cannot generate the complete set of efficient agreements unless the efficiency frontier is defined by a strictly convex curve.

The constraint method maximizes a particular party's satisfaction subject to constraints on other party's satisfaction. This method is better than the weighting method at generating the entire set of efficient agreements, but can also generate inferior solutions along flat or negatively sloped portions of the production-possibility frontier. By its nature, the constraint method cuts off a portion of the set of feasible solutions and is therefore not suitable for generating a single alternative solution.

It is evident that decision makers could benefit from improved tools to assist them in making favorable decisions, especially when confronted with conflicting objectives and demands. More rigorous research is needed on the role computers can play in helping groups make decisions and resolve conflicts, and on the impact computers have on the process outcomes as well as on the participants' attitudes. The ultimate objective is to offer negotiating parties a means by which they, or a third party facilitator, could directly define and evaluate possible settlements that would result in mutual gains for negotiating parties. Achieving this objective would be a significant step toward improving the efficiency and effectiveness of the negotiation process.

SUMMARY OF THE INVENTION

The present invention seeks to achieve the foregoing objective by providing a computer-based method and apparatus embodied as an Interactive Computer-Assisted Negotiation Process Support System (otherwise known as ICANS) which assists parties in real time toward achieving an optimal, mutually satisfactory agreement in dynamic, multi-issue, multi-party negotiations.

ICANS achieves this through use of one or more computer systems and associated interactive graphical interfaces that are used by each party involved in the negotiation process to input information pertaining to their individual preferences on each issue to be negotiated. Once preferences have been entered as mathematical representations in ICANS, the system can help parties evaluate alternatives, which are sets of potential decision values for each unresolved issue. These evaluations help parties in their task of finding a tentative solution to their problem.

ICANS first encourages parties to make a proposal or identify at least one alternative solution to the problem that their party would find acceptable. ICANS then uses the preference information provided by each party to search for equivalent alternatives to party proposals by using linear programming to solve an optimization problem for which the objective is to insure no loss in satisfaction for any party while minimizing the maximum gain achieved by any party. If all parties accept the alternative generated by ICANS as a tentative agreement, that alternative is known as a common base alternative (common base for short). The purpose of establishing the common base is to facilitate the negotiations by converting inconsistent proposals offered by each party into what is for everyone an equivalent one from which joint negotiations can proceed. If no alternative equivalent to party proposals exists, the same optimization process can be used to generate a compromise to party proposals that would represent equivalent losses to each party. This compromise, or in fact any alternative created by ICANS or any other party, can also be considered as a candidate for the common base. In some cases, the parties may all agree to a common base at the outset, thereby bypassing the need for ICANS to generate it.

Once a common base has been established, ICANS can search for an improved alternative solution that will bring greater or equal satisfaction to all parties as compared to the common base. In particular, ICANS seeks to find an alternative agreement on the satisfaction tradeoff function defining the efficiency frontier. To find an alternative on the efficiency frontier that improves upon the common base alternative, ICANS seeks to maximize the minimum gain in total relative satisfaction that can be achieved by each of the parties, again using standard linear programming techniques. The result is an alternative agreement that improves the satisfaction of one or more of the parties without decreasing the satisfaction of any of the parties. "Maximizing the minimum gain" is superior to the previously described weighting and constraint methods of multi-objective optimization. It will never generate an inferior solution (advantage over the constraint method) and works no matter what the shape of the efficiency frontier (advantage over the weighting method). In addition, the foregoing techniques of searching for and locating both the common base and the improved alternative are far superior to known "trial and error" techniques since they locate the optimal solution to the problem in a single step, and can therefore be implemented by a computer much faster. As a result, these techniques are particularly suited for use in interactive, dynamic negotiations where the preferences of the parties are changing with time, and alternative solutions need to be frequently recalculated.

Before parties can enter information regarding their preferences on the outcome of a particular issue, they each must enter a bargaining range that defines the range of acceptable outcomes for that issue from least desirable to most desirable. Within this range, ICANS generates a satisfaction function that defines a party's relative satisfaction as a function of the issue's outcome. By default, the relative satisfaction function for each issue is assumed to be linear between the extremes of the range of values specified for that issue by the party, however, the party has the option of changing that function to more accurately describe their relative satisfaction function by picking points on the graphical interface.

ICANS provides four distinct ways for each party to define their satisfaction tradeoffs between issues. Two of these ways involve comparisons of additional satisfaction associated with bargaining ranges. The additional satisfaction associated with bargaining ranges can either be defined as being equivalent or can be rated relative to each other. The other two ways involve comparisons of the satisfaction levels of two or more alternatives. In this case, alternatives can either be defined as being equivalent to one another, or can be rated relative to each other.

ICANS uses the ranges, satisfaction functions and satisfaction tradeoff information to generate a relative total satisfaction value that each alternative will provide the party. These satisfaction values, as well as the other preference information, are then employed by ICANS to generate candidates for the common base, and then, after parties have accepted a common base, the improved alternative as discussed previously.

Preferably, since each of the parties to the negotiations normally wish to have their preferences kept confidential from each of the other parties, a separate computer system and associated graphical interface are necessary for each of the parties so that they can enter their preference information separately and confidentially. The separate computer systems can be programmed to carry out all of the initial calculations including generation of the relative satisfaction functions for each issue and generation of the total satisfaction for each acceptable alternative. This information can then be transmitted to a central computer system at a neutral site which processes all of the preference data from each of the parties, uses this information to generate the equivalent alternative, and transmits the results back to each of the parties. If the parties agree, the equivalent alternative proposal is used as the common base alternative. The central computer system will then generate the improved alternative along the efficiency frontier, and once again, transmit the results back to the parties.

BRIEF DESCRIPTION OF THE DRAWINGS

The objects, features and advantages of the present invention will become more apparent from the following detailed description of a preferred embodiment thereof, taken in conjunction with the accompanying drawings, in which.

DETAILED DESCRIPTION OF THE PREFERRED EMBODIMENT

Figure 1:
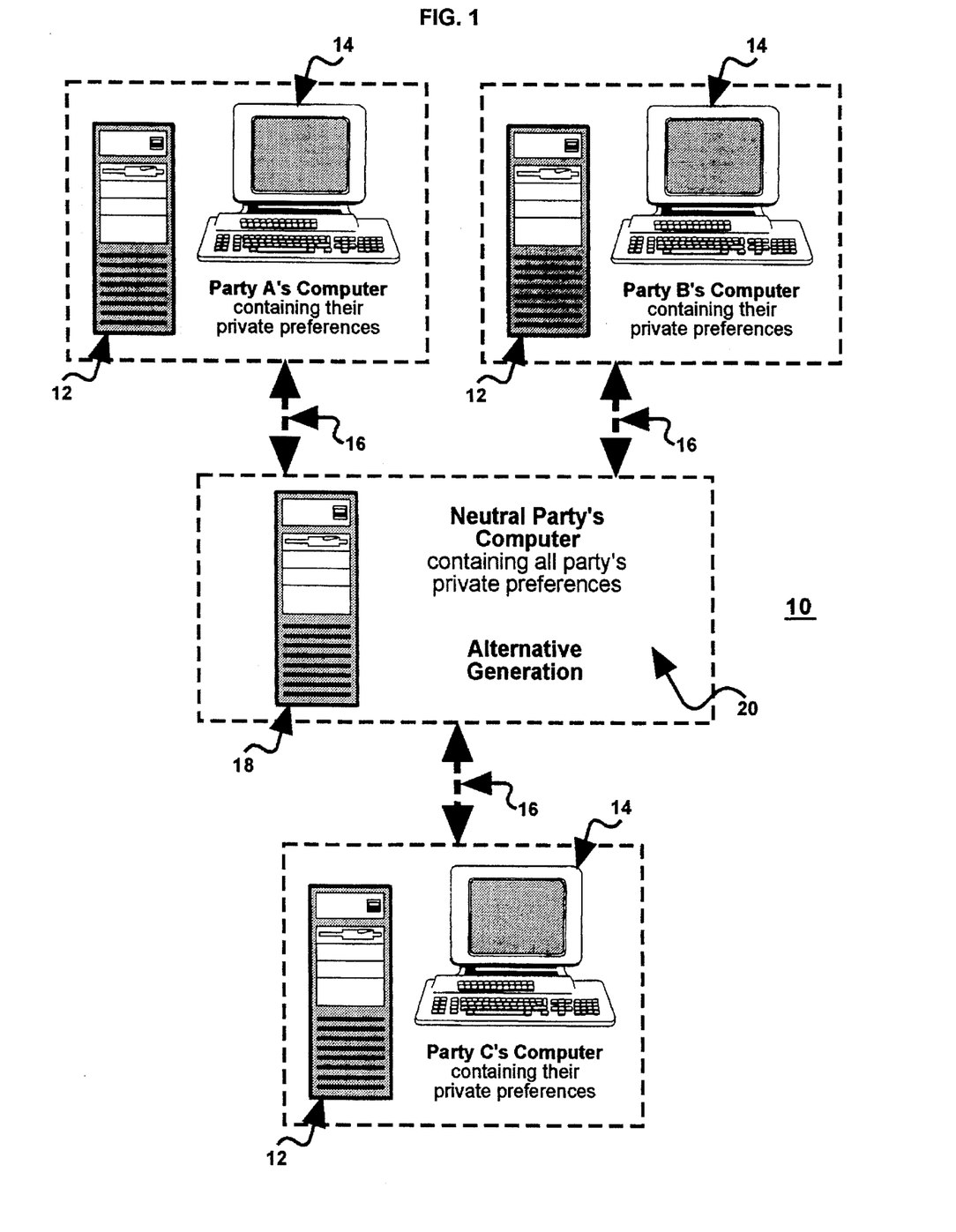
FIG. 1 is a schematic illustration of a multiple computer system apparatus for carrying out the method of the preferred embodiment for the most secure application of ICANS in which the private preferences of two or more parties are used at a neutral site for alternative generation.

Turning now to a detailed consideration of a preferred embodiment of the present invention, FIG. 1 illustrates a multiple computer system 10 which is employed for carrying out the method of the present invention. The multiple computer system 10 includes a plurality of n independent and separate computer systems 12, each of which includes a graphical interface 14 for entry and display of information. Each of the computer systems 12 is connected by a corresponding communications link 16, which can be of any conventional type, e.g., wire link, optical link, radio link, to a central computer 18 that is located at a neutral site 20. The number n of independent computer systems 12 is selected to be equal to the number of parties to a negotiation to be processed.

Each of the parties to the negotiation that are entering data to be processed, communicates with their computer system 12 by means of its graphical interface 14. In particular, each party enters information pertaining to their preferences on each issue of the problem or dispute being negotiated. Each of the computer systems 12 uses this information to make a number of calculations as described in detail below, and transmits the information and the calculation to the central computer 18. Conventional security measures are provided to insure that each party's information remains confidential from all of the other parties involved in the negotiation. The central computer 18 located at the neutral site 20 processes all of the information received from each of the computer systems 12 as discussed in greater detail below, and determines proposed solutions to the problem or dispute that will provide an optimal level of both total and individual satisfaction or benefit to the parties. These proposed solutions are then transmitted to each of the remote computer systems 12 for review and approval by all of the parties. It will be understood that in situations where the parties do not require confidentiality, the neutral site may be omitted, and if parties are willing to take turns, even a single one of the computer systems 12 and associated graphical interface 14 could be employed.

Figure 2A:
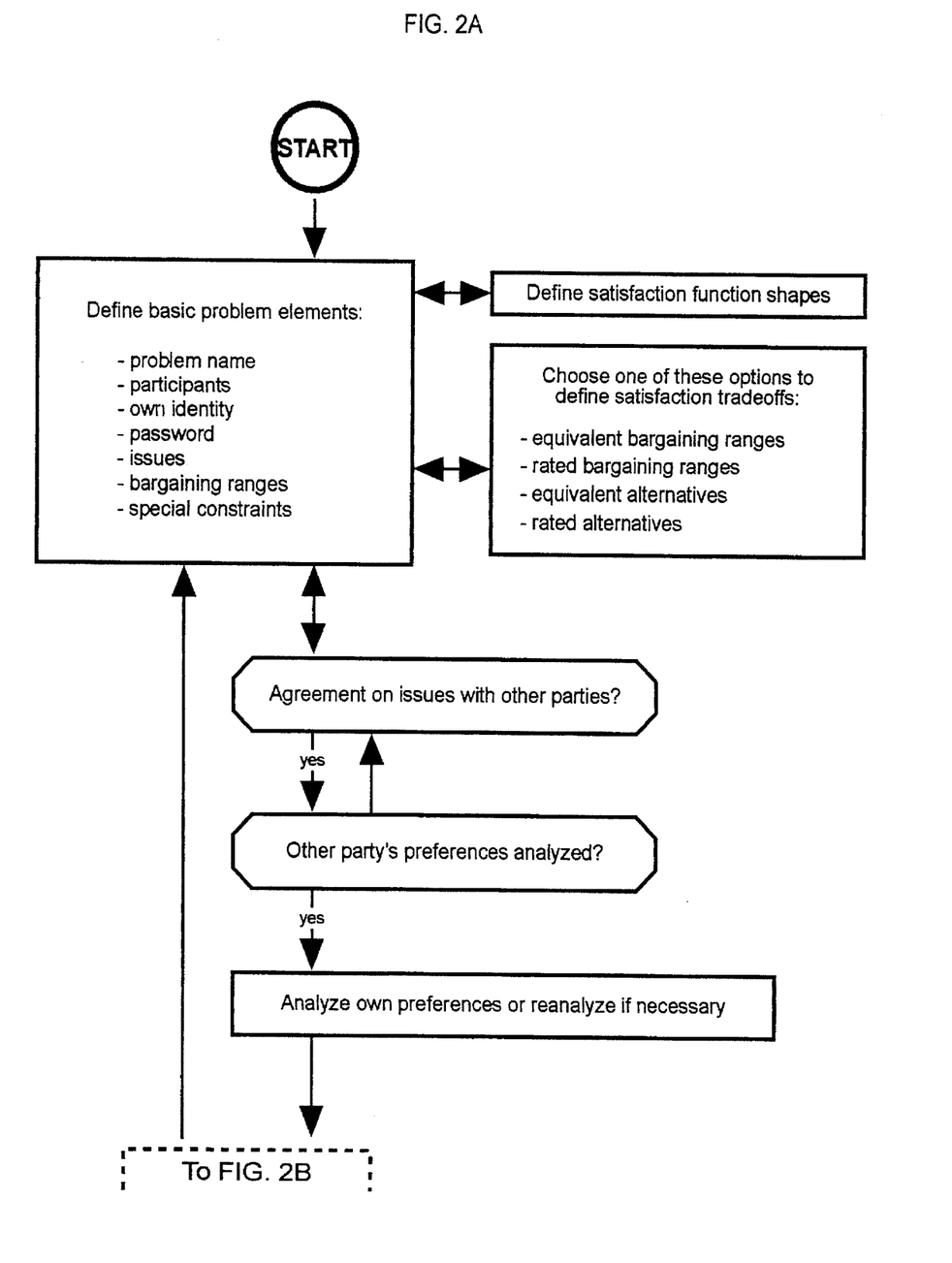
FIGS. 2A and 2B are two portions of a flow chart illustrating the method of the preferred embodiment.
Figure 2B:
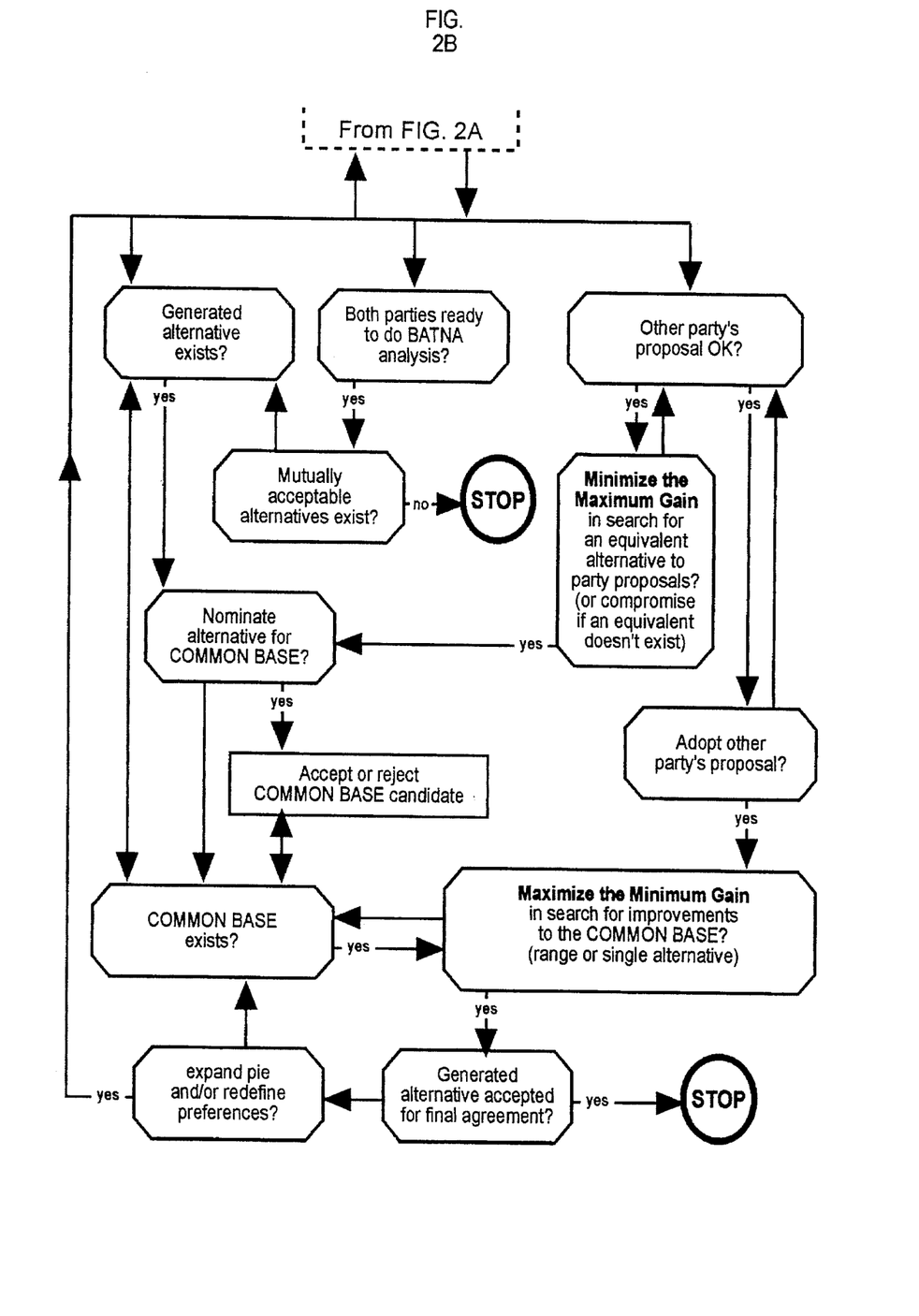

FIGS. 2A and 2B show two portions of a flow chart illustrating the specific method steps carried out by ICANS on the system 10 of FIG. 1 in the preferred embodiment of the invention. The first phase of the method is illustrated in FIG. 2A and involves entry and definition of basic problem elements and preference information from each of the parties involved in the negotiation. Each party in the negotiation can have its own individual objectives or goals, which need not be revealed to others and need not be quantified. The degree to which each objective is satisfied will be a function of the negotiated decision values for the issues at stake, and perhaps even on the process of obtaining them. Although the set of issues being considered may change during the negotiation process, it is important that the final set of issues (representing the decisions that must be made) are agreed upon, explicitly defined, understood and accepted by all parties.

To help parties realize how conflicting positions on issues might be resolved, information is needed on each party's preferences with respect to various possible alternative decisions. This information should allow evaluation of the relative satisfaction or worth of specific alternatives to the parties involved. This is usually not the kind of information each party is willing to share with other parties. Therefore, ICANS keeps such information confidential in files contained within the individual computer systems 12 that are accessible only to the party whose information is in those files.

The confidential information required from each party includes a range of possible decision values for each issue involved in the problem or dispute to be settled. This range may consist of continuous numerical values, a series of discrete numerical or linguistic values, or just yes/no, on/off, values. Each party may also enter confidential information describing their relative satisfaction within the possible ranges of each decision variable as well as information that allows the program to estimate each party's tradeoffs among different issues. Preferences are elicited in a manner that assumes people in general may not be aware of their preference structures and therefore may not be able to articulate them. If information provided is incomplete, ICANS can proceed on the basis of default values. Any information given to ICANS can be modified at any time during the negotiation process.

ICANS is designed to counteract the "fixed-pie" mentality that characterizes some negotiation processes when negotiators treat individual issues as equally important to all parties. This leads them to argue the merits of each potential decision independently, rather than discussing the entire set of issues and possible decisions. Experiments have shown the importance of negotiating the entire set of issues simultaneously, rather than separately. Therefore, ICANS forces users to consider alternatives, i.e., all issues, together, rather than separately.

In terms of equity, ICANS comes to a negotiating problem as an empty and impartial shell, taking no predetermined prescriptive role. Any final solution is allowed, but ICANS can help guide parties toward a Pareto optimal agreement, i.e., an agreement in which no party's satisfaction level can be increased without decreasing the satisfaction of at least one other party.

Figure 3:
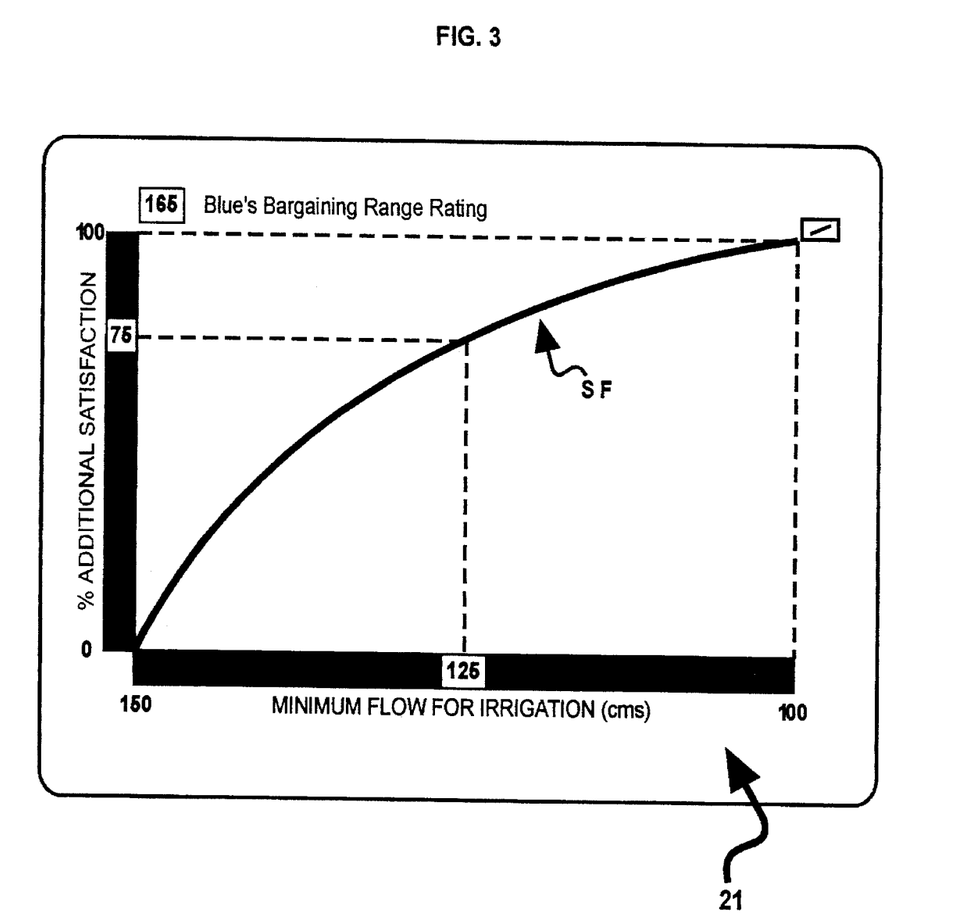
FIG. 3 is a schematic illustration of a graphical interface screen employed with the preferred embodiment for defining a satisfaction function for an issue.

The analysis of party preferences is based on an aggregation of additive satisfaction (utility) functions for each individual issue. These satisfaction functions describe each party's relative preferences for various outcomes of each individual issue in conflict relative to other possible outcomes for that issue. They do not provide information on the total relative satisfaction derived by any party from any combination of issue values, nor do they provide any information comparing overall satisfactions of multiple parties. FIG. 3 illustrates one possible display screen 21 on the graphical interface 14 which allows a party named Party Blue to define its relative additional satisfaction function labeled SF for a continuously valued example issue defined as "minimum flow for irrigation (cms)". This example problem is discussed in greater detail later.

The analysis of party preferences permits the consideration of any type of continuously valued or discontinuous (e.g., segmented, discrete, integer) smooth or kinked, linear or non-linear valued issue. In addition, special relationships among any issue variables can also be considered. Feasible values of one variable may depend on the values of other variables. In such cases users may enter constraints defining relationships among various interdependent issue variables.

Another kind of interdependence results when the satisfaction obtained from one issue depends on the decisions that would be taken for other issues. In this case the relative satisfactions are not strictly additive and more iterations are required to come to a satisfactory solution since the final values of various issues are unknown at the beginning of a negotiation process. ICANS methodology permits modification of preferences expressed in terms of these relative satisfaction functions at any time during the negotiation process. As issue values become established, any satisfaction function that is dependent or conditional on other issue values can be adjusted.

Before users can enter information about their relative satisfactions on various outcomes of a particular issue, they must enter a bargaining range for that issue. As illustrated in FIG. 2A, ICANS offers two different options for specifying tradeoffs between issues while entering bargaining ranges. The first is called "equivalent bargaining ranges", which is the default option if no other information is entered, and forces the party to deliberately define each bargaining range so that each one represents the same amount of additional satisfaction from the least preferred value to the most preferred value. The second option is called "rated bargaining ranges" which allows the party to give the additional satisfaction associated with each bargaining range a relative value. If the ranges are set appropriately, the user can think of this as relative importance. In any case, the user must realize that if the bargaining range changes so does the additional satisfaction.

Figure 4:
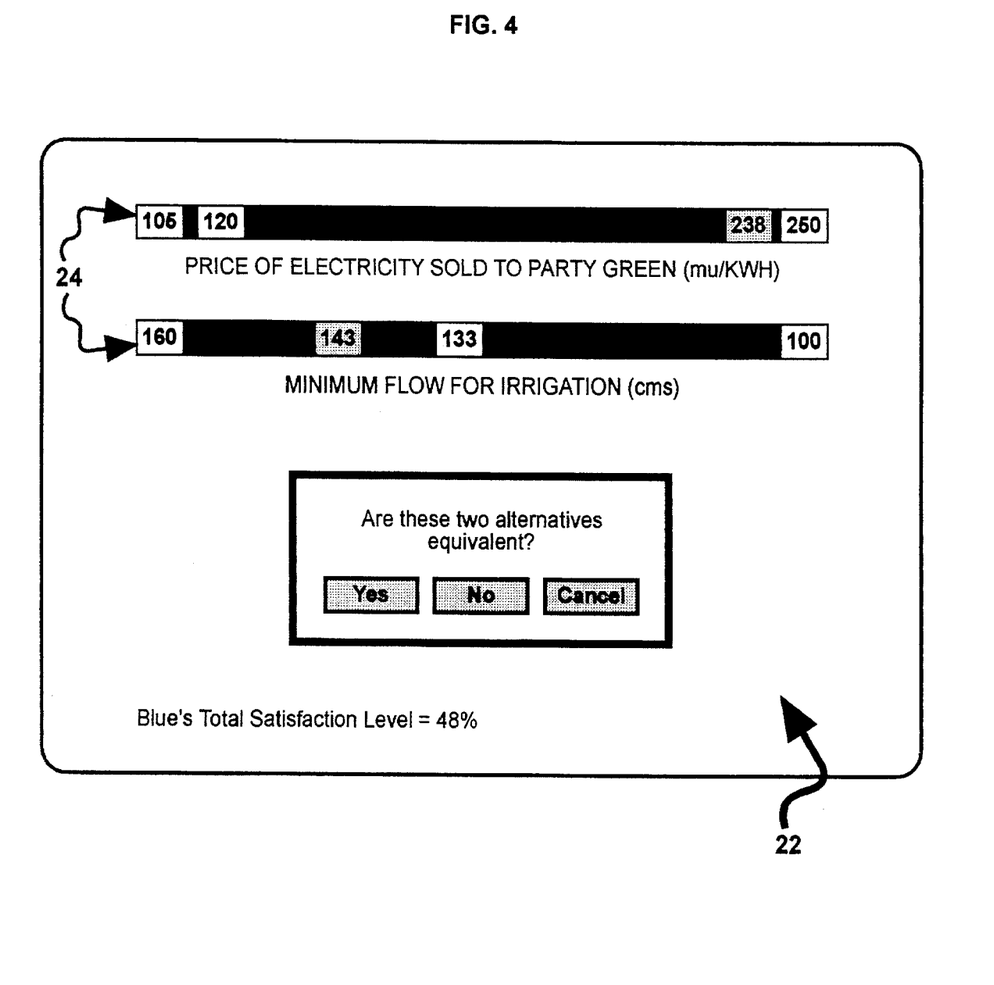
FIG. 4 is a schematic illustration of a graphical interface screen employed with the preferred embodiment for displaying and evaluating alternative solutions to a negotiation problem.

FIG. 4 illustrates another example screen 22 of the graphical interface 14 of each of the individual computer systems 12. The screen 22 illustrates a two party (Blue and Green), two issue example problem to be discussed in greater detail later in which the two issues are price of electricity sold to party Green and minimum flow for irrigation. The range of bargaining values specified by each party for each of these issues are used for defining a panel of scroll bars 24 on which alternatives can be displayed. If any alternatives to be displayed fall outside the defined ranges, ICANS will prompt the user to extend the defined satisfaction functions or let ICANS extrapolate the existing functions.

By default, the relative satisfaction function for each issue is assumed to be linear between the extremes of the range of values specified for that issue. Users have the option of changing that function to more accurately describe their relative satisfaction function by picking points along the satisfaction function SF on the screen 21 in FIG. 3. This defines the party's relative additional satisfaction, $R_i(V_i)$, associated with each possible outcome, $V_i$ of each issue i within the range of outcomes presented, given expected outcomes on other issues. These discrete or continuous relative additional satisfaction functions initially range from 0 associated with the least desirable outcome to 100 for the most desirable outcome within each specified range.

Once these relative additional satisfaction functions are defined, ICANS estimates a party's total additional satisfaction associated with alternatives, i.e., sets of issue decisions. Let $V_i^k$ be a decision taken for a particular alternative k with respect to issue i. The relative total additional satisfaction, $S_k$, is assumed to be the sum over all issues i of weighted individual relative satisfaction $R_i(V_i^k)$ so that $$S_k = \Sigma_i w_i * R_i(V_i^k) \tag{1}$$

If a user wishes to specify his or her party's satisfaction tradeoffs directly in terms of the weights, the additional satisfaction of the most preferred alternative m defined by the specified bargaining ranges must be considered. This is simply the set of most preferred values $(V_i^m)$ for each issue.

Let $S_i$ be the additional satisfaction contributed from each issue i at the most preferred value so that for each issue i $$S_i = w_i * R_i(V_i^m) \tag{2}$$

To insure that the relative total additional satisfactions, $S_k$, still range from 0 to 100, the unknown non-negative weights must sum to 1.

$$\Sigma_i w_i = 1.0 \tag{3}$$

If the user chooses the equivalent bargaining ranges option, all $S_i$ are equal so that for each issue i $$S_i = S_m \tag{4}$$

Equations 2, 3 and 4 are sufficient to solve for the unknown weights w and therefore $S_k$ for any alternative.

If the user chooses the rated bargaining ranges option and enters values, $U_i$ to represent $S_i$ according to some other arbitrary satisfaction scale of the user's own choosing, $$S_i = f * U_i \tag{5}$$

where f is an unknown conversion factor. In this case, the individual weights, $w_i$ can be solved using equations 2, 3 and 5.

ICANS presents the user with the interactive screen 22 of FIG. 4 on which alternative solutions to the problem, i.e., different sets of alternative decisions combining different values for each issue, can be created or displayed. Identifying equivalent alternatives or rating alternatives displayed on this screen are two further options by which the user can specify tradeoff preferences. As illustrated again in FIG. 2A, the first of these options is called "equivalent alternatives" in which the user must identify alternatives that are considered to be equivalent in terms of satisfaction to the party. This is usually the most intuitive method of defining tradeoffs. A decision maker that is not able to use this method is not a qualified negotiator. With this method, a decision maker must be able to decide if one alternative is better than another and then adjust one or the other until they are equivalent in terms of satisfaction to the party. Full information requires as many equivalent alternatives as there are issues.

The second option for specifying tradeoff preferences by comparing alternatives is called the "rated alternatives" option in which the satisfaction of each alternative is not the same. This method is suitable for a decision maker that has access to a simulation model of the problem that is capable of evaluating various alternatives in terms of a decision maker's objectives. Full information for this method requires one more alternative than the number of issues. The user can actually get away with defining two fewer alternatives if the set of least preferred values and the set of most preferred values are considered as alternatives and given the values of 0 and 100 respectively. This same scale must then be used for rating the other alternatives. However, in most real world cases, negotiators would probably have difficulty relating to that scale. In that case they may use their own scale and define the two additional required alternatives.

If the user chooses the equivalent alternative option to specify tradeoff preferences, that user must identify sets of alternative decisions that would yield the same relative total additional satisfaction so that $$S_k = \text{Constant} = C \quad (6)$$

For an n-issue problem, if the user provides n equivalent alternatives, equation 3 and the n equations 1 combined with equations 6 are sufficient to solve for the unknown weights and constant C.

If any user experiences difficulty in providing equivalent alternatives (as may be the case when some decision values must be discrete), or simply chooses not to, instead that user may provide a set of rated (cardinally ranked) alternatives k. The assigned ratings may be along any scale of total satisfaction or willingness-to-pay indicators. While these ratings are not always easy to determine, at least some estimate of their relative "value" is better than no estimate at all. A party's response when asked to compare two non-equivalent alternatives could be "about the same" or "a little more" or "a lot more". The same responses could involve the word "less" rather than "more". It will be necessary for each party that cannot identify equivalent alternatives to try to rate, quantitatively, a number of selected alternatives along some arbitrary scale, of any units, to allow the calculation of the weights used in equations 1 and 2.

Assuming some selected alternatives k are able to be rated, each will then have a known rating or scale value denoted by $SS_k$. Some of these scaled values could be negative. Now the weights $w_i$ need to be calculated based on unknown relative total additional satisfactions $S_k$ which are rescaled values of the rated satisfactions $SS_k$. Assume the rescaled relative total satisfaction $S_k$ is a linear function of the rated relative total satisfaction $SS_k$.

$$S_k = m \cdot SS_k + b \quad (7)$$

Equations 1 and 7 can now be combined as follows to compute the n weights $w_i$ as well as the constants m and b.

$$m \cdot SS_k + b = \Sigma_i w_i \cdot R_i(V_i^k) \quad (8)$$

If there are a total of n issues being considered and if a user can define and rate a set of n+1 specified alternatives k, the n unknown weights, $w_i$, and the unknown constants m and b can be determined by equation 3 and the n+1 equations 8. If the weight given to the additional satisfaction derived from any issue value is a function of other issue values, then the weights, $w_i$, will have to be recalculated each time the expected final decisions $V_i$ and their relative satisfaction values, $R_i(V_i)$, change.

If any party has not explicitly chosen any of the four options that ICANS provides for defining tradeoffs between issues, ICANS calculates default values for the weights, $w_i$, assuming "equivalent bargaining ranges", i.e., that each issue's relative satisfaction contributes equally to total relative satisfaction. The change in satisfaction associated with the identified bargaining range for any issue will be assumed equal to that of every other issue. Thus, the default weight for each issue is taken as the reciprocal of the range of values being considered for that issue. These default weights are used only if the user does not enter complete preference information on the first iteration.

If the number of equivalent or rated alternatives entered is some number more than one but less than the total number of issues, optimization is used to determine the actual values of the weights. These actual values will be based both on the information the party provides and on the default values. The more alternatives a party provides, up to the maximum needed, the more the party's weights will be based on those alternatives. The fewer alternatives entered, the more the weights will be based on the default values.

Referencing FIG. 2B, each party has made a proposal corresponding to an acceptable set of values for each issue, ICANS can help those parties identify a single alternative (vector of $V_i$ values) that all parties could accept as a reference alternative (called a common base) from which to proceed. If possible, ICANS will generate an equivalent alternative, a set of $V_i$ values, that will provide each party j with the same total satisfaction, as their proposed alternative, $V^*_{ij}$. It will offer this equivalent alternative as a common base.

At this stage of the negotiation process, after alternative proposals have been offered by each party, it is desirable to identify an alternative that gives each party as much satisfaction as their current proposal, but nothing more. Additional satisfaction should be the result of subsequent deliberations. The outcome of these deliberations should not be prejudged by any negotiation support system such as ICANS at this stage of the process. The appropriate role for systems like ICANS at this point is to facilitate negotiations by converting inconsistent proposals offered by each party into what is for everyone an equivalent one from which joint negotiations can proceed. ICANS can find an equivalent alternative, if one exists, because of the confidential information it has on each party's preferences. Thus it can do something for the parties they cannot do for themselves.

If such an equivalent alternative does not exist, then a compromise alternative is computed, which is intended to motivate each party to work towards making a more feasible set of counter proposals, or can serve as an acceptable common base from which improved alternatives can be identified. The procedure used in ICANS to identify an equivalent or compromise alternative involves the use of mixed integer linear programming.

Let $TS_j$ be the total additional satisfaction of party j obtained from the proposed alternative having values $V^*_{ij}$ for each issue i. The values of each $TS_j$, can be calculated from:

$$TS_j = \Sigma_i^n w_{ij} \cdot R_{ij}(V^*_{ij}) \text{ for each party } j \quad (9)$$

To try to find an equivalent alternative, ICANS' objective is to find an alternative set of decisions, a new set of $V_i$, that will provide no loss in satisfaction for any party while minimizing the maximum gain, MXGAIN, achieved by any party. Assuming that M is a large number relative to MXGAIN, the combined objective is to $$\text{minimize} \quad M.\text{GAIN} - \text{MXGAIN} \quad (10)$$

subject to:

a) definition of total satisfaction:

$$S_j = \Sigma_i^n w_{ij} \cdot R_{ij}(V_i) \text{ for all parties } j \quad (11)$$

b) definition of satisfaction difference:

$$SGAIN_j - SLOSS_j = S_j - TS_j \text{ for all parties } j \quad (12)$$

c) definition of maximum gain to any party:

$$MXGAIN \geq SGAIN_j \text{ for all parties } j \quad (13)$$

d) definition of a (0,1) gain flag, $GINT_j$:

$$SGAIN \leq GINT_j \cdot M \text{ for all parties } j \quad (14)$$

e) definition of a (0,1) loss flag, $LINT_j$:

$$SLOSS_j \leq LINT_j \cdot M \text{ for all parties } j \quad (15)$$

f) insuring either a gain or loss, but not both, for each party:

$$GINT_j + LINT_j = 1 \text{ for all parties } j \quad (16)$$

g) defining a (0,1) indicator, GAIN, to identify if a gain could be achieved for all parties:

$$GAIN \leq 1 - LINT_j \text{ for all parties } j \quad (17)$$

Additional constraints may include bargaining ranges and any other user defined constraints on the unknown issue variables $V_i$. The weights $w_{ij}$ (equations 11) are those calculated on the basis of the equivalent (or rated) alternatives provided by the parties. For each party j, $S_j$ is the total relative additional satisfaction. All variables in equations 7 through 14 are non-negative, and all GINTj and LINTj variables as well as GAIN are 0,1 integer variables.

If the value of GAIN in the solution of the above model is zero, there is no alternative that would give each party equal or more satisfaction than their proposed alternative. In such an event, some compromise alternative can be identified by ICANS as a basis for proceeding. Alternatively, all parties can make new proposals and begin the process over again. If a compromise alternative is desired, ICANS could look for the closest feasible alternative to the desired equivalent alternative. However, this would likely lie on or close to the efficiency frontier and would be contrary to ICANS philosophy of avoiding generating optimal solutions prior to parties having decided upon an alternative that represents an acceptable division of benefits among all parties. Instead, ICANS will generate an alternative that provides (as close as possible) the average of all the original satisfactions of all proposals to all parties. This alternative could then be a reference point from which to work toward an improved (more satisfying) alternative.

FIG. 2B also illustrates a query labeled "Both parties ready to do BATNA analysis?" BATNA stands for "Best Alternative To A Negotiated Agreement" and represents the minimum acceptable total additional satisfaction for each party below which it would be better to walk away from the negotiations than agree to a settlement. Any proposed alternative which provides any party with a lower level of satisfaction than the level provided by their BATNA, would therefore provide an unacceptable solution to the conflict. Although a party will usually not wish to reveal its BATNA to other parties, ICANS gives the parties the option of entering such an alternative in confidence at any time during the negotiation process. If both parties enter their BATNA as a proposed alternative, ICANS can analyze them by searching for an equivalent alternative using the previously discussed optimization routine defined by equations 10–17. If no feasible equivalent alternative is found, ICANS concludes that there is likely no region of potential agreement if all preference information is confirmed to be complete and accurate. Otherwise, ICANS will advise the parties to continue negotiations to search for an existing mutually satisfactory solution.

ICANS requires parties to agree on an equivalent or compromise alternative (as a common base alternative) before any search for improvements begins. This alternative could be the one identified by ICANS, but parties do not necessarily have to use that alternative. They may instead select some other alternative as a starting point for further negotiation. When all parties have agreed to such a common reference alternative, the common base, they can ask ICANS to generate improvements. ICANS' role then becomes one of leading negotiators to an alternative on the efficiency frontier.

To identify a set of solutions on the efficiency frontier that should (if user preference information is still correct) bring greater or at least equal satisfaction to all parties when compared to the common base, ICANS selects those alternatives that maximize the minimum gain in total relative satisfaction, MNGAIN, achieved by all parties, while assuring that a Pareto optimal alternative is generated:

$$\underline{\text{maximize}} \quad MNGAIN + TGAIN/M \quad (18)$$

subject to:

a) definition of the minimum of the weighted gains:

$$MNGAIN \leq (S_j - TS_j) \cdot W_j \text{ for all parties } j \quad (19)$$

b) definition of total net gain of all parties j:

$$TGAIN = \Sigma_j (S_j - TS_j) \quad (20)$$

together with equations 8 defining the total relative additional satisfaction $S_j$ for each party j.

In equation 19, each $TS_j$ is the known total satisfaction of party j associated with the common base alternative, and the $W_j$ is a positive known weight on the gain of party j. The second term in equation 18, the total net gain divided by a relatively large number M, helps avoid non-dominant solutions in which one or more parties could gain without the possibility of other parties' satisfaction increasing, i.e. MNGAIN would not increase.

The solution of the model (equations 11, 18, 19 and 20) will identify different alternatives on the efficiency frontier for different values of the weights, $W_j$. If the parties wish only one alternative, the weights, $W_j$, are all set to 1, giving the party having the lowest net gain the maximum obtainable. All other parties will get at least that much if not a larger gain in relative satisfaction from the identified alternative.

The parties involved in negotiations may want to be presented with more than one alternative to choose from. Achieving agreement on one alternative as the best compromise from among the multitude of possibilities when many parties have conflicting interests could be difficult if there is little cooperation and willingness to compromise. However, if desired, ICANS can identify and display the range of improvements to the parties.

Once an alternative has been chosen, whether it be one identified by ICANS or not, negotiators may request a search for further improvements, either single alternatives or ranges. This process can be repeated until ICANS can no longer identify any improvements. ICANS can do what each individual party cannot do for itself because ICANS has confidential information not available or known by each individual party. Further, the interactive nature of ICANS allows it to assist the negotiation process in real time by dynamically recalculating alternatives as party preferences change with time.

To illustrate the operation of the ICANS method, consider a simple hypothetical negotiation problem between two parties called Blue and Green. For the present example, one issue is the price of electricity to be charged to Party Green by Party Blue. Party Blue, which is proposing to build a hydroelectric power plant, wants a high price; obviously Party Green wants the opposite. Party Green not only wants a low price for electricity but also a reliable minimum flow of water for irrigation development, which is the second issue. The flow of water for irrigation would be diverted upstream of Party Blue's proposed site for the hydroelectric dam. A system simulation (context) model indicates that the higher the minimum flow allocated to irrigation, the lower the expected output of hydroelectric energy. Party Green has control over the flow to be allocated to irrigation, and Party Blue has control over the production and pricing of hydropower. Each party wants to maximize its net income and institutional power and influence, provide a reliable service to its clients and possibly satisfy other objectives that we do not know about. None of these objectives needs to be quantified for ICANS.

In an actual real-world negotiation, parties would know how they become satisfied on particular issues but may not be able to articulate the satisfaction function, much less write it down and ICANS does not require parties to directly specify this function. However, for the sake of illustration assume that we know what the satisfaction functions are. Recognizing that typical real-world satisfaction functions are non-linear, suppose that Party Blue's normalized function can be accurately modeled as $$S_b = 150.3 - 500 * e^{(-0.03 * Price)} - 0.005 * Flow^2 \quad (21)$$

and Party Green's satisfaction can be modeled as $$S_g = 153.0 - 0.5 * Price - 250 * e^{(-0.04 * Flow)} \quad (22)$$

where:

Price=price of electricity sold to Party Green (mu/KWH)
mu=monetary unit
Flow=minimum flow (at some specified reliability, location and time) that will be guaranteed to Party Green (cms)

The above functions would be based on the particular physical and economic context of the negotiation problem. Parties may think in terms of monetary units or something completely different. The actual magnitudes of the coefficients are arbitrary but the ratio of one coefficient to another would depend on how each party considered tradeoffs among the issues.

The coefficients in each of the above equations have been normalized with unit conversion coefficients so that each term is in the same satisfaction units although the units of one equation are not necessarily comparable to the units of the other. Each of the two issues is continuously valued and additive in each satisfaction function. Inspection of the functions above show that satisfaction is a linear function of the electricity price for Party Green but nonlinear for Party Blue. Satisfaction associated with the other issue, minimum flow guaranteed to Party Green for irrigation development, is nonlinear for each party.

FIG. 3 illustrates one possible display screen on the graphical interface 14 which will allow Party Blue to define its relative additional satisfaction function for the continuously valued issue that all parties have mutually defined as "Minimum Flow for Irrigation (cms)". The parties have agreed to use cubic meters per second (cms) as a unit of measurement for potential decisions on this issue. Additional satisfaction on this issue is shown scaled out of 100%. Having already entered a bargaining range from 100 to 150 cms, Party Blue has chosen the curve type to be smooth continuous and picked one point on the graph (125 cms) which has been indicated as providing 75% additional satisfaction to Party Blue. The resulting display is a piecewise-linear approximation of a smooth curve through the picked point. More points can be entered and the resulting curve will connect all the entered points. A box in the upper right corner of the graph in FIG. 3 indicates whether the most preferred valve is a hard or soft constraint and whether satisfaction beyond the most preferred valve decreases or continues to increase. In this case Party Blue has indicated a soft constraint with satisfaction continuing to increase.

Also shown on this screen is a display for Blue's bargaining range rating for this issue. This rating can be on any scale as long as the ratings for all bargaining ranges are on that same scale. If Blue had chosen "equivalent bargaining ranges", ICANS would assume that all bargaining range ratings were equal. In this case, it can be assumed that either Blue has entered the value 165, having chosen "rated bargaining ranges", or ICANS has calculated the value based on preference data from alternative comparisons, either "equivalent alternatives" or "rated alternatives".

If a particular relative satisfaction function also depends on the values of other issues (interdependence), then to define that function it is first necessary to make an assumption concerning the values of those other issues. In the negotiation process, whenever these assumed values are not reasonably close to the actual values being seriously considered for an agreement, ICANS will lose the ability to guide the parties accurately toward a most preferred solution. However, a party always has access to and can modify its own relative additional satisfaction functions as often as considered necessary. It is therefore not critical what values are initially assumed for the other dependent issues but it will shorten the negotiation process if the first guesses are close to the final values.

Once the relative additional satisfaction functions are defined, or their linear default values are assumed, ICANS allows the parties to consider alternative solutions to the conflict as illustrated in FIG. 4. Various menu options allow users to display, work with, and evaluate alternatives created by themselves and, if not confidential, those created by ICANS or other parties. FIG. 4 illustrates Party Blue comparing two alternatives in order to define satisfaction tradeoffs. ICANS encourages parties to identify "equivalent alternatives". If Blue indicates that the alternatives are not equivalent, that party must then choose the "rated alternatives" option and give each alternative a satisfaction rating on some relative scale.

Suppose that Party Blue and Party Green have each decided to propose a solution to the conflict, i.e., an alternative defined by a particular set of potential decision values within the displayed bargaining ranges. In the present example, assume that for the hydroelectric price, Party Blue proposes 238 monetary units per KWH and Party Green proposes 157. For a minimum irrigation flow, Party Blue proposes 143 cms and Party Green proposes 160. Clearly these two proposals are not the same. However, it might be possible to find other feasible combinations of decision values, i.e., other alternatives that would be equally or more preferred by all parties to their proposed alternatives. This is exactly what ICANS does in searching for and defining a candidate for the common base alternative.

Figure 5:
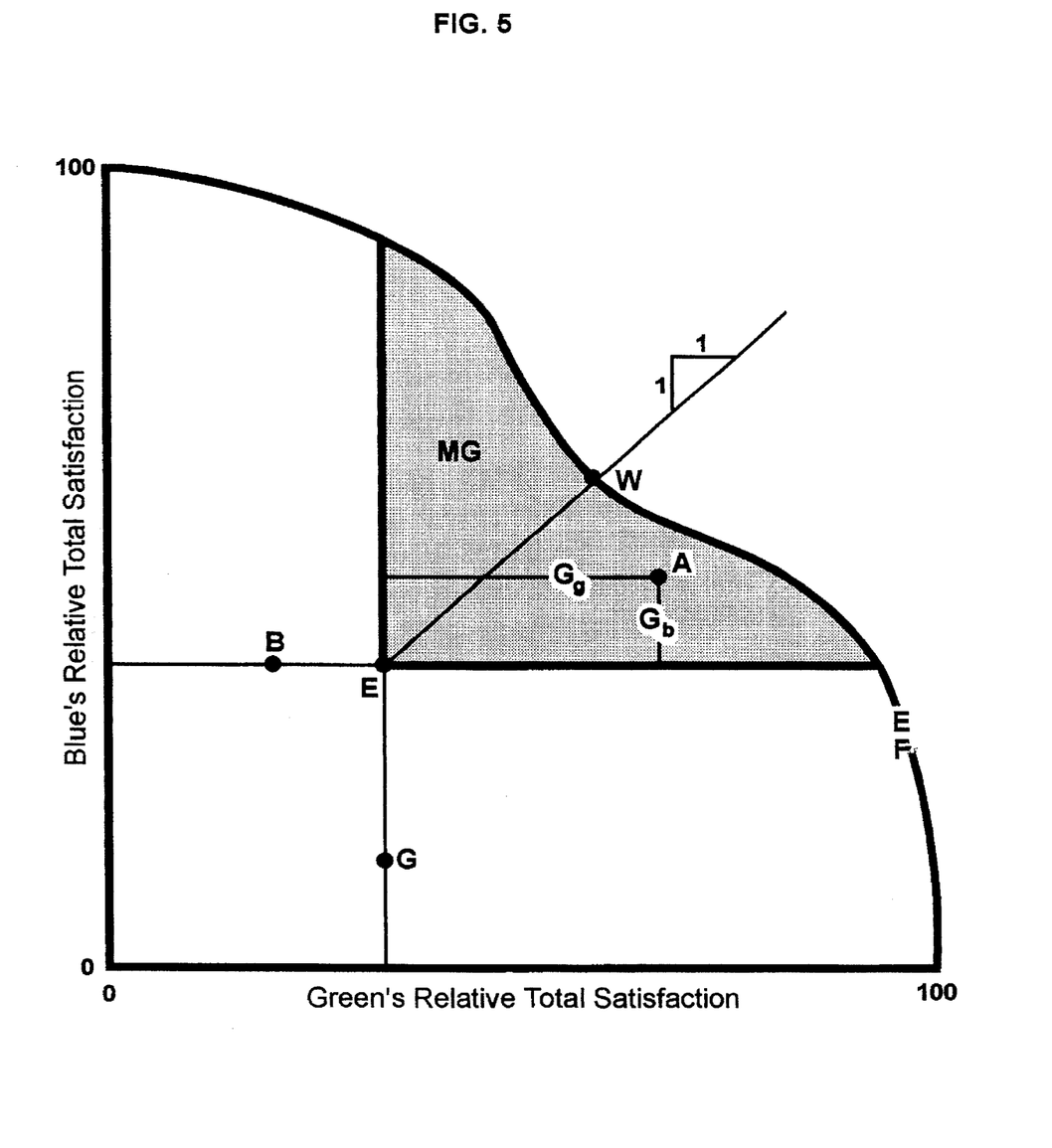
FIG. 5 is a graph in satisfaction space for a simple two-party example problem in which the relative total satisfaction from alternatives of one party is plotted against the relative total satisfaction of the other party. Also illustrated are the efficiency frontier, the common base alternative and an improved alternative.

FIG. 5 is a graph illustrating the satisfaction of Party Blue as a function of the satisfaction of Party Green. The point labeled B represents the levels of satisfaction provided by Party Blue's proposal, while the point labeled G represents the satisfaction levels provided by Party Green's proposal. The goal of ICANS is to generate an alternative to both of these proposals which provides the same level of satisfaction to both parties. This point is labeled E on the graph and represents the common base alternative.

The curve labeled EF in FIG. 5 is a boundary defining what is commonly known in the art as the "efficiency frontier", where efficiency is defined according to Pareto. This boundary defines the group of satisfaction points that provide the most efficient possible solutions to the conflict. ICANS goal once it has established the common base alternative is to improve upon the alternative and come up with an alternative labeled W which lies on the efficiency frontier.

In determining the common base alternative represented by point E, ICANS attempts to maintain the satisfaction level of both parties the same as in their chosen proposals. The goal therefore is to "minimize the maximum gain" in satisfaction that either of the two parties experiences in going from their proposal to the common base alternative. In other words, it is most desirable that the maximum gain be zero for both parties.

FIG. 5 also shows a diagonal ray with a slope of 1 that includes the equivalent satisfaction point E representing the common base alternative, and passes through a shaded region labeled MG known as the region of mutual gain. This region is so named because any alternatives that lie therein will provide gains in satisfaction to both parties as compared to the common base alternative. For this two party problem, the ray divides the shaded region of mutual gain into two portions. Suppose that point A represents some arbitrary alternative in the lower portion. $G_b$ and $G_g$ represent the gains that Party Blue and Party Green, respectively, would achieve with that alternative. Since the maximum gain is $G_g$, any alternatives to the left of point A will be better solutions to the optimization problem. Similarly, for any alternative in the upper portions, the maximum gain would go to Party Blue and therefore better alternatives would be those that were lower. Therefore, if an alternative exactly equivalent to all party proposals exists, "minimizing the maximum gain" will find it at the equivalent satisfaction Point E. If such an alternative does not exist, the solution will be the closest feasible alternative within the region of mutual gain.

The calculation of the common base alternative in this example using equations 10–17 is done with standard mixed integer linear programming software (e.g., LINGO produced by LINDO Systems, Inc.) by minimizing equation 10 while satisfying equations 11–17. Equation 11 is simply the total satisfaction for each of the parties, which is calculated in this example to be 48 for Party Blue and 74 for Party Green.

Equation 12 simply defines the satisfaction difference for each party between the common base alternative and the party's proposal. This preferably will be zero.

Equation 13 defines the maximum gain to be the greatest of the individual gains of the parties in going from their proposal to the common base alternative. Again, this value is preferably zero.

Equation 14 defines a gain flag that has either a 0 or a 1 value, this being a i if the party in question has a gain, and a 0 if the party does not have a gain.

Equation 15 defines a similar loss flag which has a 0 value if the party in question does not have a loss, and a 1 value if the party does have a loss.

Equation 16 sets forth that the gain integer and loss integer for all parties must equal 1 which insures either a gain or a loss, but not both, for each party.

Finally, equation 17 is a gain indicator which identifies if a gain could be achieved for all parties and is a 1 if so, a 0 if not.

Returning now to equation 10, the goal is to minimize the maximum gain and satisfaction achieved by any of the parties minus the gain indicator set forth in equation 17 multiplied by a very large number M, M being any number larger than the largest value that maximum gain could ever take on. The purpose of this element in equation 10 is to insure that ICANS will not find a solution in which the maximum gain is minimized, however, one or more parties suffers a loss in the process. Using mixed integer linear programming, the solution to the above problem is approximately 156 for price and 140 for flow, with the total satisfaction to Blue still remaining at 48, and a total satisfaction to Green still remaining at 74.

Next, if the parties mutually agree to the solution as the common base alternative, ICANS seeks to improve upon the common base alternative by finding an alternative on the efficiency frontier. As illustrated in FIG. 5, this is preferably accomplished by traveling along the ray with slope 1 to the point W. Since the slope of the ray is 1, the increase in additional satisfaction for Party Blue in going from the common base to the improved alternative W, is exactly equal to the increase in Party Green's additional satisfaction. This is the same as saying that the minimum gain of both parties has been maximized, for any other solutions on the efficiency frontier would provide less increase in satisfaction either to Party Blue for points below and to the right of point W, or to Party Green for points to the left and above point W.

Equation 18 defines the goal of ICANS in going from the common base to the improved alternative W to be maximization of the minimum gain plus the total net gain divided by a relatively large number M. The purpose of the second term in equation 18 is to insure that ICANS finds the best solution which results in the maximum minimum gain for each party. For example, ICANS may locate two different solutions, one that provides slightly more gain to one of the parties, but the same gain to the other party. In this case, the first alternative is the better choice since the total gain is greater. The reason that the total net gain is divided by the large number M in equation 18 is to minimize its influence on the outcome, and avoid internal rounding difficulties that may occur.

For the above example, ICANS determines that the alternative W provides a price of 105 and a flow of 108, and results in a satisfaction to Party Blue of 71, and a satisfaction to Party Green of 97, both of which provide substantial improvements in satisfaction to each of the parties than was provided by their original individual proposals. This result is constrained by the defined bargaining ranges illustrated in FIG. 4. ICANS will encourage parties to search for further benefits to be achieved by one or more parties by "expanding the pie", e.g., extending bargaining ranges or adding issues to the problem.

In summary, ICANS provides a computer-based method and apparatus for interactive computer-assisted negotiations that result in agreements being reached among the parties that are far superior in both individual and overall benefit to agreements obtained using previous computer-based techniques. In addition, ICANS achieves this in a much quicker manner than known "trial and error" techniques. In particular, by first generating, in a single step, the common base alternative in which the maximum gain in satisfaction for any of the parties is minimized and no party experiences any loss in satisfaction, and then generating, also in a single step, an improved alternative along the efficiency frontier by maximizing the minimum gain in satisfaction that any individual party receives, ICANS quickly generates an agreement that optimizes both the individual and overall benefit to all of the parties.

Although the present invention has been disclosed in terms of a preferred embodiment, it will be understood that numerous variations and modifications could be made thereto without departing from the scope of the invention as set forth in the following claims. For example, the simple two party, two issue example discussed above illustrating the ICANS method can be extrapolated to problems with any number of parties and issues, and any degree of complexity. Also, it should be understood that the use of ICANS is not limited to providing only complete agreements to a dispute or conflict. It can also be employed for providing partial agreements that only settle some of the issues in conflict.

What is claimed is:

1. A computer-based method for assisting at least two parties involved in a multiple issue negotiation problem toward achieving an optimal mutually satisfactory agreement on decisions to be taken on one or more of said issues comprising the steps of:

a) providing at least one programmed computer system and an associated interactive graphical interface for interactive input and output of information to and from said computer system, said computer system being programmed to generate at least one proposed agreement on decisions to be taken on one or more of said issues of said negotiation problem in response to entered preference data from each of said parties;

b) entering into said computer system through said graphical interface information pertaining to each said party's preferences on the outcome of each of said plurality of issues involved in said negotiation problem;

c) in response to said entering of said information, said programmed computer system:

i) identifying a tentative agreement to said negotiation problem which is satisfactory to said parties and provides a specified level of satisfaction for each said party;

ii) generating an improved alternative agreement that is Pareto optimal according to said entered preferences by using linear programming techniques and substantially maximizing the minimum gain in satisfaction that is achieved by any of said parties with the improved alternative agreement as compared to the tentative agreement; and, iii) displaying said improved alternative agreement on said graphical interface.

2. The computer-based method of claim 1, further including the steps of:

d) entering into said computer system changed preference information and/or a different tentative agreement; and, e) in response to said entering of said changed preference information, said programmed computer system generating a new alternative agreement.

3. The computer-based method of claim 2, wherein said step of identifying a tentative agreement to said negotiation problem further comprises:

i) identifying a plurality of proposed agreements, one for each of said parties, each said proposed agreement being satisfactory to its corresponding party and providing a specified level of satisfaction for that party;

ii) if said plurality of proposed agreements are not identical to one another, generating an alternative proposed agreement from said plurality of proposed agreements and said preference information using linear programming techniques for providing a level of satisfaction to each said party that is at least as great as the level of satisfaction provided by each said party's proposed agreement and minimizing the maximum gain in satisfaction to any of said parties over the level of satisfaction in each party's proposed agreement; and, iii) displaying said alternative proposed agreement on said interactive graphical interface for consideration by parties as said tentative to said negotiation problem.

4. The computer-based method of claim 3, wherein said step of providing at least one computer system and an associated interactive graphical interface further comprises:

i) providing a plurality of independent, separate computer systems and associated interactive graphical interfaces, one each for each of said parties, each said independent, separate computer system being programmed to receive and process information pertaining to each of said party's preferences on the outcome of each of said plurality of issues involved in said conflict; and, ii) providing a central computer system located at a neutral site and a plurality of communication links connecting each of said independent, separate computer systems to said central computer system, said central computer system being programmed to receive preference information from each of said independent, separate computer systems and generate at least one proposed agreement to the negotiation problem in response to entered preference information from each of said independent, separate computer systems;

wherein, the information pertaining to each of said party's preferences remains confidential to each party.

5. The computer-based method of claim 4, wherein said step of entering information pertaining to each said party's preferences further comprises entering bargaining range information for each of said issues, said bargaining range information being employed by the corresponding one of said independent, separate computer systems to define a satisfaction function for each issue.

6. The computer-based method of claim 5, further comprising the step of each said independent, separate computer system providing a plurality of options for parties to define satisfaction tradeoffs between issues.

7. The computer-based method of claim 6, wherein said plurality of options includes "equivalent bargaining ranges" in which the bargaining ranges for each of said issues are selected to be equivalent to one another, "rated bargaining ranges" in which the bargaining ranges for each of said issues are rated different from one another, "equivalent alternatives" in which each said party identifies a plurality of proposed alternatives that are specified to be equivalent to one another; and, "rated alternatives" in which each of said parties identifies a plurality of proposed alternatives and enters information rating said plurality of proposed alternatives relative to one another.

8. The computer-based method of claim 5, further comprising the step of entering into each said independent, separate computer system satisfaction function information for each of said issues.

9. The computer-based method of claim 8, wherein each one of said plurality of proposed agreements is identified by the corresponding party and entered into the corresponding one of said independent, separate computer systems, and said specified level of satisfaction is determined by each of said independent, separate computer systems from said satisfaction function information.

10. The computer-based method of claim 5, wherein each one of said plurality of proposed agreements is identified by the corresponding party and entered into the corresponding one of said independent, separate computer systems, and said specified level of satisfaction is determined by each of said independent, separate computer systems from said satisfaction function.

11. The computer-based method of claim 1, wherein said step of generating an improved alternative agreement further comprises:

i) searching for improved alternative agreements by substantially maximizing the minimum gain in satisfaction achieved by any of said parties;

ii) if a plurality of alternative agreements are located by substantially maximizing the minimum gain in satisfaction achieved by any of said parties, then determining which one of said plurality of alternative agreements results in the most total gain in satisfaction of all parties; and, iii) generating as said improved alternative agreement, said alternative agreement resulting in the most total gain in satisfaction of all parties.

12. A computer-based apparatus for assisting at least two parties involved in a multiple issue negotiation problem toward achieving an optimal mutually satisfactory agreement on decisions to be taken on one or more of said issues, said apparatus comprising:

a) at least a first computer system, said computer system including a computer programmed for:
      i) receiving information pertaining to each party's preferences on the outcome of each of said plurality of issues involved in said negotiation problem;
      ii) identifying a potential agreement to said negotiation problem as a tentative agreement, said tentative agreement providing a specified level of satisfaction for each of said parties; and,
      iii) generating an improved alternative agreement from said tentative agreement using linear programming techniques to substantially maximize the minimum gain in satisfaction that is achieved by any of said parties with said improved alternative agreement as compared to said tentative agreement; and, b) interactive graphical interface means connected to said computer system for entering preference data from each of said parties to said computer system, and displaying said generated improved alternative agreement.

13. The computer-based apparatus of claim 12, wherein said computer is further programmed for generating said tentative agreement from a plurality of proposed agreements, one for each of said parties, comprised of potential decisions to be taken on at least one of said issues, each said proposed agreement being satisfactory to its corresponding party and providing a specified level of satisfaction for that party, said tentative agreement being generated from said plurality of proposed agreements using linear programming techniques for providing a level of satisfaction to each said party that is at least as great as the level of satisfaction provided by each said party's proposed agreement, and minimizing the maximum gain in satisfaction to any of said parties over the level of satisfaction in each party's proposed agreement.

14. The computer-based apparatus of claim 12, wherein said computer is further programmed for allowing said parties to interactively enter new information pertaining to each party's preferences and thereby cause said computer system to generate a new improved alternative agreement corresponding to said new information.

15. A computer-based apparatus for assisting at least two parties involved in a multiple issue negotiation problem toward achieving an optimal mutually satisfactory agreement on decisions to be taken on one or more of said issues, comprising:

a) a plurality of independent, separate computer systems, one for each of said parties, each said computer system being programmed to receive and process information pertaining to each said party's preferences on the outcome of each of said plurality of issues involved in said negotiation problem;

b) a plurality of interactive graphical interfaces connected, one each, to each of said independent and separate computer systems for input and output of information to and from the corresponding one of said computer systems;

c) a central computer system located at a neutral site for processing preference information received from each of said independent separate computer systems and generating at least one proposed agreement to the negotiation problem in response to the inputted preference information from each of said parties, said central computer system also including means to maintain each said party's preference information confidential from every other one of said parties; and d) communication link means connecting each of said independent, separate computer systems with said central computer system.

16. The computer-based apparatus of claim 15, wherein said central computer system is further programmed for:

i) receiving a tentative agreement to said negotiation problem from one or more of said plurality of independent, separate computer systems, said tentative agreement providing a specified level of satisfaction for each said party; and, ii) generating an improved alternative agreement from said tentative agreement that is Pareto optimal according to said information pertaining to each said party's preferences, said improved alternative agreement being generated using linear programming techniques by substantially maximizing the minimum gain in satisfaction that is achieved by any of said parties with the improved alternative agreement as compared to the tentative agreement.

17. The computer-based apparatus of claim 16, wherein said central computer system is further programmed for generating said tentative agreement from a plurality of proposed agreements, one for each of said parties, each said proposed agreement being communicated to said central computer system from the corresponding one of said plurality of independent, separate computer systems, each said proposed agreement being satisfactory to its corresponding party and providing a specified level of satisfaction for that party, said tentative agreement being generated from said plurality of proposed agreements using linear programming techniques so that said tentative agreement provides a level of satisfaction to each said party which is at least as great as the level of satisfaction provided by each said party's proposed agreement, and minimizes the maximum gain in satisfaction to any of said parties over the level of satisfaction in each party's proposed agreement.

18. The computer-based apparatus of claim 15, wherein said central computer system is further programmed for:
   i) receiving a tentative agreement to said negotiation problem from at least one of said plurality of independent, separate computer systems, said tentative agreement providing a specified level of satisfaction for each said party; and,
   ii) generating an improved alternative agreement from said tentative agreement.

19. The computer-based method of claim 6, wherein said plurality of options includes "rated bargaining ranges" in which the bargaining ranges for each said issues are rated different from one another and "rated alternatives" in which each of said parties identifies a plurality of proposed alternatives and enters information rating said plurality of proposed alternatives relative to one another.

20. A computer-based method for assisting at least two parties involved in a multiple issue negotiation problem toward achieving an optimal mutually satisfactory agreement on decisions to be taken on one or more of said issues comprising the steps of:
   a) providing a plurality of independent, separate computer systems and associated interactive graphical interfaces, one for each of said parties, each said independent, separate computer system being programmed to receive and process information pertaining to each of said party's preferences on the outcome of each of said plurality of issues involved in said conflict;
   b) providing a central computer system located at a neutral site and a plurality of communication links connecting each of said independent, separate computer systems to said central computer system, said central computer system being programmed to receive preference information from each of said independent, separate computer systems and generate at least one proposed agreement to the negotiation problem in response to entered preference information from each of said independent, separate computer systems;
   c) each party entering into their corresponding one of said independent, separate computer systems through its associated interactive graphical interface, bargaining range information and satisfaction function information for each of said issues;
   d) each party then selecting at least one of a plurality of options for defining satisfaction tradeoffs between issues;
   e) transmitting entered preference information comprising said bargaining range, satisfaction function and satisfaction tradeoff information from each of said independent, separate computer systems to said central computer system;
   f) said central computer system generating at least one proposed agreement to the negotiation problem in response to said transmitted preference information and transmitting said proposed agreement to each of said independent, separate computer systems; and
   g) if all parties involved in said multiple issue negotiation problem agree to said proposed agreement, then causing said central computer system generate an improved alternative agreement that is Pareto optimal according to said entered preference information; and
   h) displaying said improved alternative agreement on each of said graphical interfaces of each of said independent, separate computer systems.

* * * * *